United States Patent
Lee et al.

(10) Patent No.: US 10,048,539 B2
(45) Date of Patent: Aug. 14, 2018

(54) METHOD OF MANUFACTURING BACKLIGHT UNIT OF CURVED DISPLAY DEVICE

(71) Applicant: Samsung Display Co., Ltd., Yongin-si, Gyeonggi-do (KR)

(72) Inventors: Kangwoo Lee, Seoul (KR); Yudong Kim, Suron-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 456 days.

(21) Appl. No.: 14/944,098

(22) Filed: Nov. 17, 2015

(65) Prior Publication Data

US 2016/0207065 A1 Jul. 21, 2016

(30) Foreign Application Priority Data

Jan. 15, 2015 (KR) .................. 10-2015-0007599

(51) Int. Cl.
*G02F 1/13* (2006.01)
*G02F 1/1335* (2006.01)
*G02F 1/1333* (2006.01)

(52) U.S. Cl.
CPC .. *G02F 1/133605* (2013.01); *G02F 1/133305* (2013.01); *G02F 1/133608* (2013.01); *G02F 1/133609* (2013.01); *G02F 2001/133612* (2013.01); *G02F 2001/133613* (2013.01); *G02F 2001/133614* (2013.01); *Y10T 29/49885* (2015.01)

(58) Field of Classification Search
CPC ......... G02F 1/133605; G02F 1/133608; G02F 1/133609; G02F 1/133611; G02F 1/133602; G02F 2001/133612; G02F 2001/133613; G02F 2001/133614; Y10T 29/49885
USPC ............ 29/458; 362/624, 625, 628, 632–634
See application file for complete search history.

(56) References Cited

U.S. PATENT DOCUMENTS

| | | | |
|---|---|---|---|
| 7,920,223 B2 * | 4/2011 | Nishizawa | G02F 1/133308 349/58 |
| 9,113,553 B2 * | 8/2015 | An | H05K 5/0217 |
| 9,202,395 B2 * | 12/2015 | Cho | G09F 9/35 |
| 9,483,964 B2 * | 11/2016 | Choi | G09F 9/30 |
| 9,551,893 B2 * | 1/2017 | An | H05K 5/0217 |
| 9,575,361 B2 * | 2/2017 | Choi | G02F 1/133605 |
| 2007/0146569 A1 * | 6/2007 | Nouchi | G02B 6/0088 349/58 |
| 2009/0091681 A1 * | 4/2009 | Nishizawa | G02F 1/133308 349/58 |
| 2009/0316062 A1 * | 12/2009 | Nishizawa | G02F 1/133305 349/58 |

(Continued)

FOREIGN PATENT DOCUMENTS

| | | |
|---|---|---|
| JP | 2012-118440 | 6/2012 |
| KR | 10-0335070 | 4/2002 |
| KR | 10-0605386 | 7/2006 |

(Continued)

*Primary Examiner* — Bayan Salone
(74) *Attorney, Agent, or Firm* — H.C. Park & Associates, PLC

(57) ABSTRACT

Provided is a method of manufacturing a backlight unit of a curved display device. The method includes providing a bottom chassis having a predetermined curvature radius, manufacturing a reflection member, and disposing the reflection member on the bottom chassis.

15 Claims, 10 Drawing Sheets

(56) References Cited

U.S. PATENT DOCUMENTS

2013/0329162 A1* 12/2013 Fujii .................. H05K 7/14
                                                                           349/58
2014/0009914 A1* 1/2014 Cho .................. G09F 9/35
                                                                          362/97.3

FOREIGN PATENT DOCUMENTS

| KR | 10-0782218 | 11/2007 | | |
|---|---|---|---|---|
| KR | 10-1167709 | 7/2012 | | |
| KR | 10-1209170 | 11/2012 | | |
| KR | 10-1505433 | 3/2015 | | |
| KR | 20150068135 A | * | 6/2015 | ............... H05K 5/02 |

* cited by examiner

METHOD OF MANUFACTURING BACKLIGHT UNIT OF CURVED DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 15 Jan. 2015 and there duly assigned Serial No. 10-2015-0007599.

BACKGROUND OF THE INVENTION

Field of the Invention

The present disclosure relates to a method of manufacturing a backlight unit of a curved display device, and more particularly, to a method of manufacturing a reflection member of a backlight unit of a curved display device.

Description of the Related Art

Flat panel display devices such as liquid crystal display devices and organic electroluminescence display devices are being used to display images in various information processing devices such as TVs, monitors, notebook computers, and mobile phones.

Recently, a curved display device applied with the flat panel display device is being developed. The curved display device may be provided with a display area having a curved shape to provide an image in which a three-dimensional effect and a sense of immersion are improved to a user.

The above information disclosed in this Background section is only for enhancement of understanding of the background of the invention and therefore it may contain information that does not form the prior art that is already known in this country to a person of ordinary skill in the art.

SUMMARY OF THE INVENTION

The present disclosure provides a method of easily manufacturing a backlight unit of a curved display device.

Embodiments of the inventive concept provide methods of manufacturing a backlight unit of a curved display device. The methods include: providing a bottom chassis having a predetermined curvature radius; manufacturing a reflection member; and disposing the reflection member on the bottom chassis.

In the providing of the bottom chassis, a bottom chassis includes: a bottom part that is a curved surface which is concavely curved in a first direction to have a predetermined curvature radius. A plurality of sidewalls bent from the bottom part may be prepared.

The sidewall parts may include: first and second sidewall parts disposed spaced apart from each other in the first direction with the bottom part therebetween; and third and fourth sidewall parts disposed spaced apart from each other in a second direction perpendicular to the first direction. The third and fourth sidewall parts are curved along the curved surface.

The manufacturing of the reflection member may include manufacturing a first reflection member and preparing a second reflection member.

The manufacturing of the first reflection member may include: preparing a print screen on which print areas allowing a reflection control material to be penetrated therethrough are defined; providing a reflection sheet including body areas and bridge areas connecting the body areas to each other; disposing the print screen on the reflection sheet so that the print areas correspond to printed areas of the body areas, respectively; printing a reflection control pattern on each of the printed areas; removing the print screen from the reflection sheet; and cutting the bridge areas to separate the body areas from each other.

The body areas may include first sidewall areas each of which has a shape corresponding to that of each of the third and fourth sidewall parts. Here, bridge areas may include a first bridge area connecting the first side areas to each other.

The body areas may further include an edge area surrounding the first sidewall areas. Here, the bridge areas may further include second bridge areas connecting the edge area to the first sidewall areas. Here, the printed areas may be the first sidewall areas. The reflection control patterns are formed on the first sidewall areas.

The second reflection member may include a bottom area and second sidewall areas. The bottom area may have a shape corresponding to that of the bottom part of the bottom chassis. The bottom area may have a rectangular shape to correspond to the shape of the bottom part. The bottom area may include a plurality of openings.

In the disposing of the reflection sheet on the bottom chassis, the first sidewall areas may be disposed on the third and fourth sidewall parts, and the bottom area and the second sidewall areas may be disposed on the bottom part and the first and second sidewall parts.

The reflection adjustment pattern is a reflection amount reduction pattern for reducing reflectivity of incident light.

In other embodiments, the method may include providing a bottom chassis having a predetermined curvature radius, manufacturing a third reflection member, and disposing the third reflection member on the bottom chassis.

The manufacturing of the third reflection member may include: preparing a print screen on which print areas allowing a reflection control material to be penetrated therethrough are defined; providing a reflection sheet including body areas and bridge areas connecting the body areas to each other; disposing the print screen on the reflection sheet so that the print areas correspond to printed areas of the body areas, respectively; printing a reflection control pattern on each of the printed areas; removing the print screen from the reflection sheet; and cutting the bridge areas to separate the body areas from each other.

The body areas may include a bottom area and first to fourth sub areas. The bottom area may correspond to the bottom part of the bottom chassis and include a plurality of openings. The first and second sub areas may be respectively connected to both sides of the bottom area in a state where the first and second sub areas are spaced apart from each other in the first direction and may have shapes respectively corresponding to those of the first and second sidewall parts. The third and fourth sub areas may be disposed spaced apart from each other in the second direction and have shapes respectively corresponding to those of the third and fourth sidewall parts.

The bridge areas may include: at least one third bridge area connecting the third sub area to one end of the bottom area; and at least one fourth bridge area connecting the fourth sub area to the other end of the bottom area facing the one end of the bottom area.

The printed areas may be the first to fourth sub areas. The reflection control patterns are printed on the first to fourth sub areas.

In the disposing of the reflection sheet on the bottom chassis, the third and fourth sub areas may be disposed on the third and fourth sidewall parts, respectively, and the bottom area, the first and second sub areas may be disposed on the bottom part, the first and second sidewall parts, respectively.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
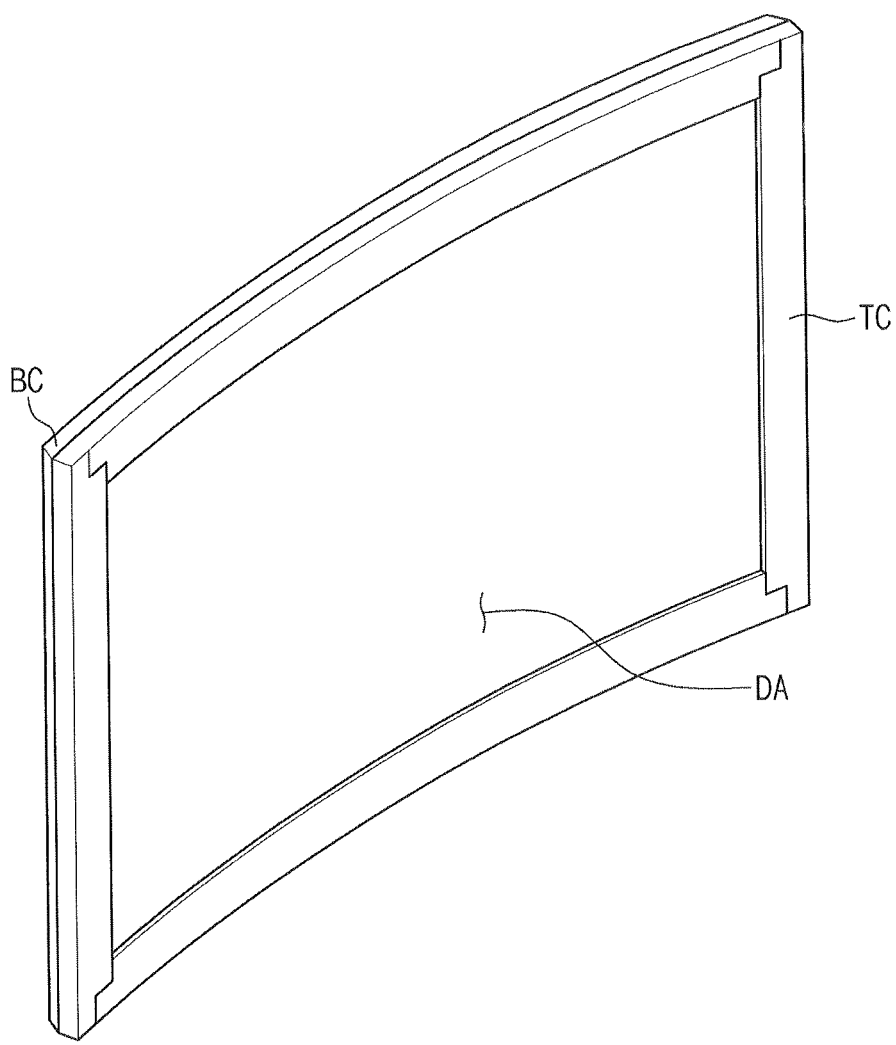
FIG. 1 is a perspective view of a display device according to an embodiment of the inventive concept.

Since the present disclosure may have diverse modified embodiments, preferred embodiments are illustrated in the drawings and are described in the detailed description of the inventive concept. However, this does not limit the present disclosure within specific embodiments and it should be understood that the present disclosure covers all the modifications, equivalents, and replacements within the idea and technical scope of the inventive concept.

The meaning of 'include' or 'comprise' specifies a property, a numeral, a step, an operation, an element or a combination thereof, but does not exclude other properties, numerals, steps, operations, elements or combinations thereof. In the specification, it will be understood that when a layer (or film), a region, or a plate is referred to as being 'on' another layer, region, or plate, it can be directly on the other layer, region, or plate, or intervening layers, regions, or plates may also be present. On the other hand, it will be understood that when a layer, a film, a region, or a plate is referred to as being 'under' another layer, region, or plate, it can be directly under the other layer, film, region, or plate, or intervening layers, regions, or plates may also be present.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. Terms are only used to distinguish one component from other components. For example, a first element referred to as a first element in one embodiment can be referred to as a second element in another embodiment. The terms of a singular form may include plural forms unless referred to the contrary.

Hereinafter, embodiments of the inventive concept will be described in detail with reference to accompanying drawings.

Figure 2:
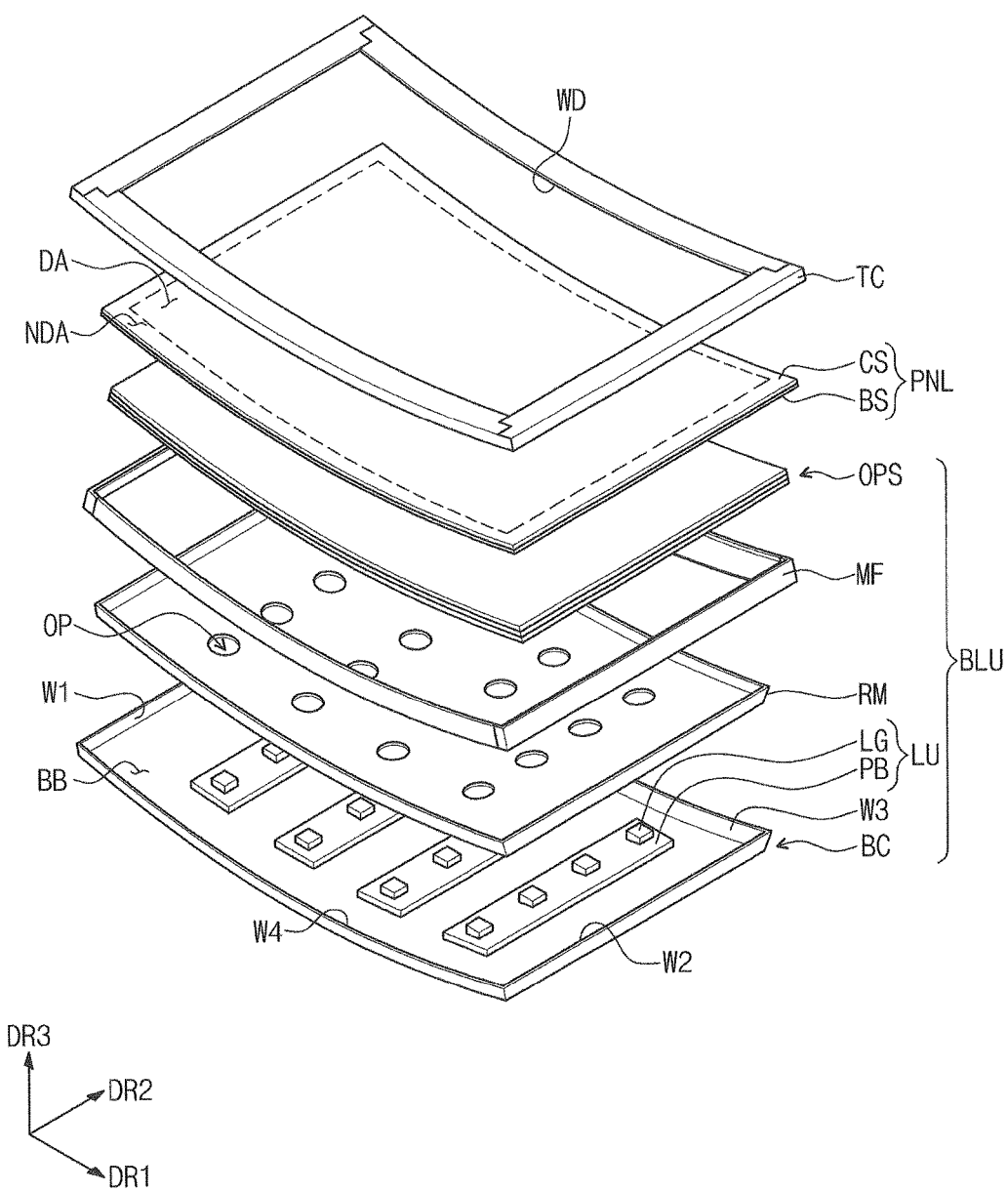
FIG. 2 is an exploded perspective view of the display device of FIG. 1.

FIG. 1 is a perspective view of a display device according to an embodiment of the inventive concept, and FIG. 2 is an exploded perspective view of the display device of FIG. 1.

In reference to FIGS. 1 and 2, a curved display according to an embodiment of the inventive concept has a curved shape. In detail, the curved display device may have a concavely curved shape in a first direction DR1 so that the curved display device has a predetermined curvature radius.

The curved display device includes a display panel PNL, a top chassis TC, and a backlight unit BLU. Here, for convenience in description, although a direction in which an image is displayed in the curved display device is defined as an upper (upward) direction, and a direction opposite to the upper direction is defined as a lower (downward) direction, the upper or lower directions may be relative concepts and thus be changed in other directions.

The display panel PNL is configured to display an image. The display panel PNL is a non-emissive display panel, which is one of various display panels such as a liquid crystal display panel, an electrowetting display panel, an electrophoretic display panel, and a microelectromechanical system (MEMS) display panel. However, the kind of the display panel PNL will not be limited. For example, the display panel PNL may be an organic electroluminescence display panel or a plasma display panel. In this case, each of the organic electroluminescence display panel and the plasma display panel may emit light itself to display an image. In one embodiment of the inventive concept, for example, the liquid crystal display panel will be described for convenience in description.

In one embodiment of the inventive concept, the display panel PNL has a rectangular shape having a pair of long sides and a pair of short sides. Here, a direction in which the long sides extend is defined as a first direction DR1, and a direction in which the short sides extend is defined as a second direction DR2 that is perpendicular to the first direction DR1. The image is provided in a third direction DR3 that is perpendicular to the first and second directions DR1 and DR2.

The display panel PNL may have flexibility. That is, the display panel PNL may initially have a flat or curved shape and may have be changed in shape in a state where the display panel PNL is finally assembled as a curved display device and thus have other shapes. The display panel PNL may be curved in various manners. The display panel PNL may be convexly curved downward or upward. However, the display panel PNL will not be limited in the curved direction. For example, the display panel PNL may have a central portion that is convexly curved upward, that is, a central portion that is convexly curved toward a user. Alternatively, the display panel PNL may have a portion that is convexly curved upward and the other portion that is convexly curved downward. Alternatively, although the display panel PNL may initially have a curved shape, the display panel may be hard without having flexibility.

In one embodiment of the inventive concept, an example in which the display panel PNL is concavely curved along the first direction DR1 will be described. In particular, a structure in which the display panel PNL is concavely curved downward so that the display panel PNL has a finally curved cross-section having a predetermined curvature radius when the display panel PNL is cut in the first direction DR1 will be described as an example. In this disclosure, the curvature radius represents a curvature radius when the display panel is cut in a direction perpendicular to the plane along a curved direction on any plane. However, the display panel PNL may be provided in a curved shape along the first direction DR1 and the second direction DR2 in another embodiment. Also, in another embodiment, it is considered that the display panel PNL may be curved in other direction instead of the first direction DR1 and the second direction DR2.

Here, when the user is positioned at a predetermined position from the display panel PNL, a distance from the user to an end of the display panel PNL may be substantially the same as that from the user to a center of the display panel PNL. Thus, the image may be seen to the user without distortion.

The display panel PNL has a display area DA on which the image is displayed and a non-display area NDA disposed at least one side of the display area DA.

The display panel PNL includes a base substrate BS, an opposite substrate CS opposite to the base substrate BS, and a liquid crystal layer (not shown) disposed between the base substrate BS and the opposite substrate CS. The top chassis TC covers an edge of the display panel PNL. According to an embodiment of the inventive concept, the base substrate BS may include a plurality of pixel electrodes (not shown) and a plurality of thin film transistors (not shown) electrically connected to the pixel electrodes to correspond to the pixel electrodes one by one. Each of the thin film transistors switches a driving signal provided to the pixel electrode corresponding thereto. Also, the opposite substrate CS may include a common electrode (not shown) forming electric fields controlling arrangement of the liquid crystal together with the pixel electrodes. The display panel PNL may drive the liquid crystal layer to display the image at a front side.

The top chassis TC is disposed on the display panel PNL. The top chassis TC covers a front edge of the display panel PNL, i.e., the non-display area NDA. A display window WD exposing the display area DA of the display panel PNL is defined in the top chassis TC. The top chassis TC may be formed of plastic or aluminum, or stainless steel. The top chassis TC may be curved along the curvature radius of the display panel PNL.

The backlight unit BLU is a unit for providing light to the display panel PNL. The backlight unit BLU is disposed under the display panel PNL. The backlight unit BLU may include a light source unit LU, a bottom chassis BC, a reflection member RM, optical sheets OPS, and a mold frame MF supporting the optical sheets OPS.

The light source unit LU generates light. In one embodiment of the inventive concept, the light source unit LU may include a printed circuit board PB and a plurality of light emitting diode packages LG mounted on the printed circuit board PB to emit the light.

The printed circuit board PB may have a rectangular plate shape extending in the second direction DR2. The printed circuit board PB may be provided in plurality. The plurality of printed circuit board PB may be parallel spaced apart from each other in the first direction DR1. However, the printed circuit board PB may have a rectangular plate shape extending in the second direction DR2 or have one rectangular plate shape corresponding to a surface facing the display panel PNL. The printed circuit board PB will not be limited to the shape thereof.

The plurality of light emitting diode packages LG may be arranged in a line along a direction in which the printed circuit board PB extends.

The bottom chassis BC accommodates the light source unit LU. The bottom chassis BC may have a curved shape along the curved shape of the display panel PNL.

The bottom chassis BC includes a bottom part BB facing the display panel PNL and a plurality of sidewall parts W1 to W4 curved from the bottom part BB. The bottom part BB is concavely curved in the first direction DR1 and is a curved surface having the predetermined curvature radius. The light source unit LU is disposed on the bottom part BB.

The sidewall parts W1 to W4 are divided into a first sidewall part W1 and a second sidewall part W2 that are spaced apart from each other in the first direction DR1 with the bottom part BB therebetween and a third sidewall part W3 and a fourth sidewall part W4 that are spaced apart from each other in the second direction DR2 along the curved surface.

The reflection member RM may be disposed on the light source unit LU. The reflection member RM may be accommodated in the bottom chassis BC with the light source unit LU therebetween. The reflection member RM may reflect the leaking light that is emitted from the light source unit LU but is not provided to the display panel PNL to change a path of the light to the display panel PNL. The reflection material RM may include a material reflecting the light such as polyethylene terephthalate (PET) or aluminum (Al). The reflection member RM has the predetermined curvature radius and thus is curved. The reflection member RM will be described later.

The optical sheets OPS are disposed between the light source unit LU and the display panel PNL. The optical sheets OPS may control the light emitted from the light source unit LU. The optical sheets OPS include a diffusion sheet, a prism sheet, and a protection sheet that are layered on the reflection member RM.

The diffusion sheet may diffuse the light. The prism sheet may collect the light diffused by the diffusion sheet in a direction perpendicular to a plane of the display panel PNL disposed thereon. Most of the light passing through the prism sheet may be vertically incident into the display panel PNL. The protection sheet is disposed on the prism sheet. The protection sheet may protect the prism sheet from external impact. In the current embodiment, although the optical sheets OPS has one diffusion sheet, one prism sheet, and one protection sheet, the present disclosure is not limited thereto. For example, the optical sheets OPS may select at least one of the diffusion sheet, the prism sheet, and the protection sheet, and the selected one sheet may be provided in plural so that the plurality of sheets are stacked on each other. If necessary, any one sheet may be omitted. Alternatively, the diffusion sheet, the prism sheet, and the protection sheet may be stacked on each other in reverse order.

The optical sheets OPS may be curved to have the same curvature radius as that of the display panel PNL.

The mold frame MF is provided along the edge of the display panel PNL to support the display panel PNL under the display panel PNL. Also, the mold frame MF may support the optical sheets OPS disposed under the display panel PNL.

The mold frame MF may have a fixing member, for example, a hook protrusion (not shown), for fixing or supporting the display panel PNL and the optical sheets OPS or other components, e.g., a portion of the light source unit LU. The mold frame MF may be disposed on positions corresponding to four sides of the display panel PNL or on a position corresponding to at least one portion of the four sides of the display panel PNL. For example, the mold frame MF may have a rectangular ring shape corresponding to the four sides of the display panel or have a " ⊏ " shape corresponding to three sides of the edge of the display panel PNL. The mold frame MF may integrally formed in a single body. However, if necessary, the mold frame MF may be provided in plural, and the plurality of the mold frame MF may be assembled with each other. The mold frame MF may be formed of an organic material such as a polymer resin. However, the present disclosure is not limited thereto, and for example, if the mold frame has the same shape and function as the mold frame MF, the mold frame may be formed other materials.

The mold frame MF may be curved along the curvature radius of the display panel PNL.

Figure 3A:
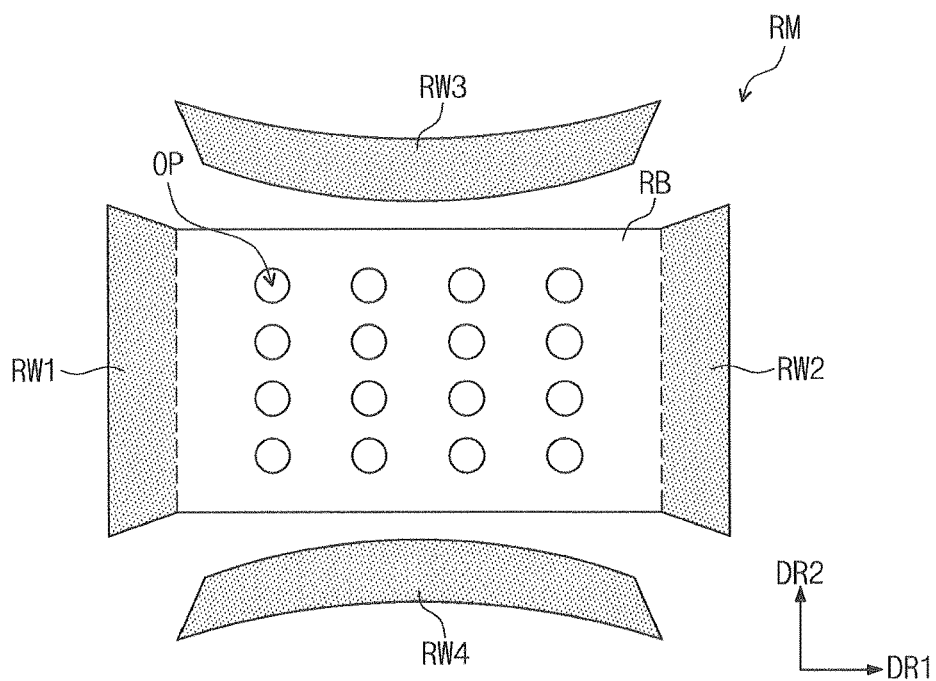
FIG. 3A is a plane view of a reflection member according to an embodiment of the inventive concept.
Figure 3B:
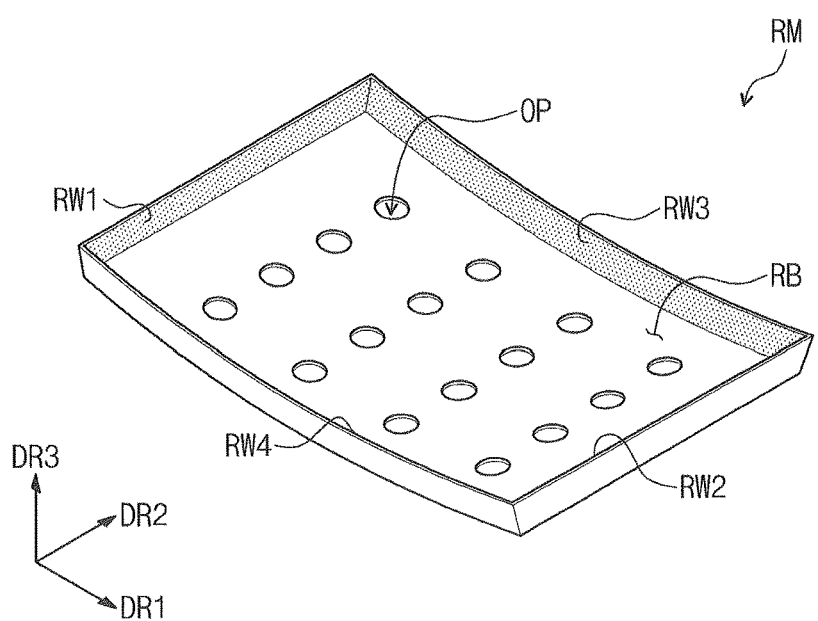
FIG. 3B is a perspective view of the reflection member according to an embodiment of the inventive concept.

FIG. 3A is a plane view of a reflection member according to an embodiment of the inventive concept. FIG. 3B is a perspective view of the reflection member according to an embodiment of the inventive concept. Hereinafter, the reflection member RM will be described with reference to the drawings. The reflection member RM includes a bottom area RB corresponding to the bottom part BB of the bottom chassis BC and sidewall areas corresponding to the first to fourth sidewall parts W1 to W4 of the bottom chassis BC.

The bottom area RB may have a rectangular shape corresponding to the shape of the display panel PNL. The bottom area RB may be curved to have the same curvature radius as that of the display panel PNL while being assembled. The bottom area RB includes a plurality of openings OP. The openings OP may be disposed to correspond to the plurality of light emitting diode packages LG, respectively.

The sidewall areas include a first sidewall area corresponding to the third and fourth sidewall parts W3 and W4 and a second sidewall area corresponding to the first and second sidewalls W1 and W2.

The second sidewall area includes a first sidewall reflection part RW1 and a second sidewall reflection part RW2. The first sidewall reflection part RW1 is connected to one short side of the bottom area RB. The second sidewall reflection part RW2 is connected to the other short side of the bottom area RB facing the one short side of the bottom area RB. The first and second sidewall reflection parts RW1 and RW2 may be bent from the bottom area RB to extend toward the display panel PNL. Also, the first and second sidewall reflection parts RW1 and RW2 correspond to the one and the other short sides of the bottom area RB to extend in the second direction DR2.

The first sidewall area includes a third sidewall reflection part RW3 and a fourth sidewall reflection part RW4. The third and fourth sidewall reflection parts RW3 and RW4 may correspond and be connected to the one long side and the other long side, respectively. Each of the third and fourth sidewall reflection parts RW3 and RW4 connects the first sidewall reflection part RW1, the second sidewall reflection part RW2, and the bottom area RB. Each of the third and fourth sidewall reflection parts RW3 and RW4 may be curved along the curved surface of the bottom area RB.

A reflection control pattern for adjusting a light reflection amount is printed on a top surface of each of the first to fourth sidewall reflection parts RW1 to RW4. The reflection control pattern may reduce a degree in which the light emitted from the light source unit LU and incident into the sidewall reflection parts RW1 to RW4 is reflected from the first to fourth sidewall parts RW1 to RW4.

FIG. 4A to 4G are plane views illustrating a method of manufacturing a backlight unit of a curved display device according to an embodiment of the inventive concept. Hereinafter, the method of manufacturing the backlight unit of the curved display device with reference to FIGS. 2 and 4A to 4G. For convenience of description, repeated descriptions of the backlight unit BLU according to an embodiment of the inventive concept will be omitted.

The method of manufacturing the backlight unit of the curved display device according to an embodiment of the inventive concept includes providing a bottom chassis having a predetermined curvature radius, manufacturing a reflection member, and disposing the reflection member on the bottom chassis.

In the providing of the bottom chassis, a bottom part BB which is a curved surface concavely curved in a first direction DR1 and having the predetermined curvature radius and the bottom chassis BC including first to fourth sidewall parts W1 to W4 curved from the bottom part BB are prepared.

In an embodiment of the inventive concept, the manufacturing of the reflection member may include manufacturing a first reflection member and preparing a second reflection member.

The manufacturing of the first reflection member includes preparing a print screen on which print areas through which a reflection control material penetrates are defined, providing a reflection sheet including body areas and bridge areas connecting the body areas to each other, disposing the print screen on the reflection sheet so that the print areas respectively correspond to areas to be printed (hereinafter, referred to as "printed areas") of the body areas, printing reflection control patterns on the printed areas, removing the print screen from the reflection sheet, and cutting the bridge areas to separate the body areas from each other.

Figure 4A:
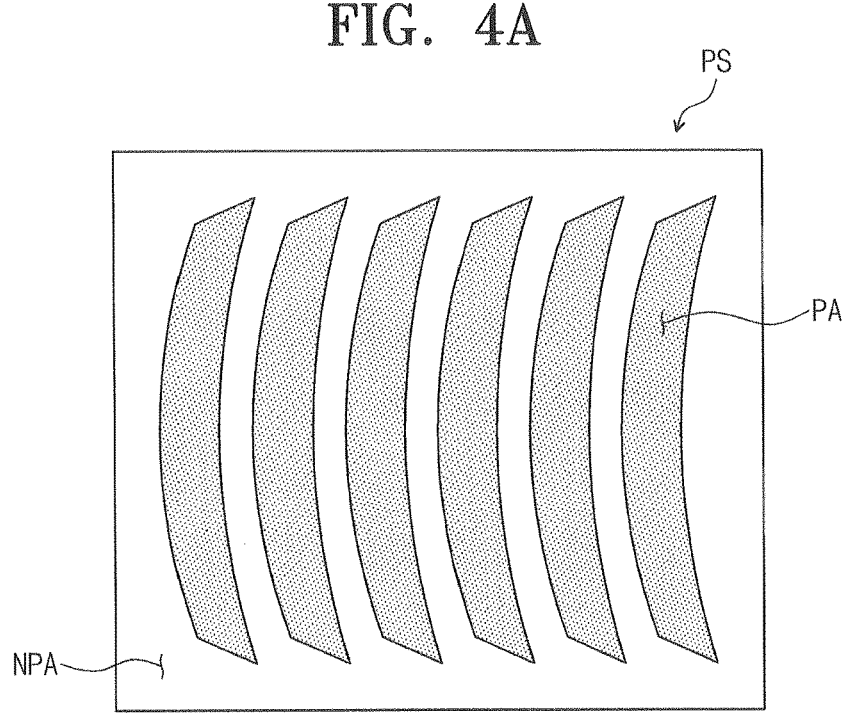
FIG. 4A to 4G are plane views illustrating a method of manufacturing a backlight unit of a curved display device according to an embodiment of the inventive concept.

FIG. 4A is a plane view of the print screen PS for explaining the preparing of the print screen.

First, as illustrated in FIG. 4A, the print screen including the print areas PA through which the reflection control material penetrates and the non-print area except for the print areas is provided. Each of the print areas PA has a shape corresponding to that of each of the third and fourth sidewall parts W3 and W4. The print areas PA may be spaced a predetermined distance apart from each other and parallelly arranged along one direction.

Figure 4B:
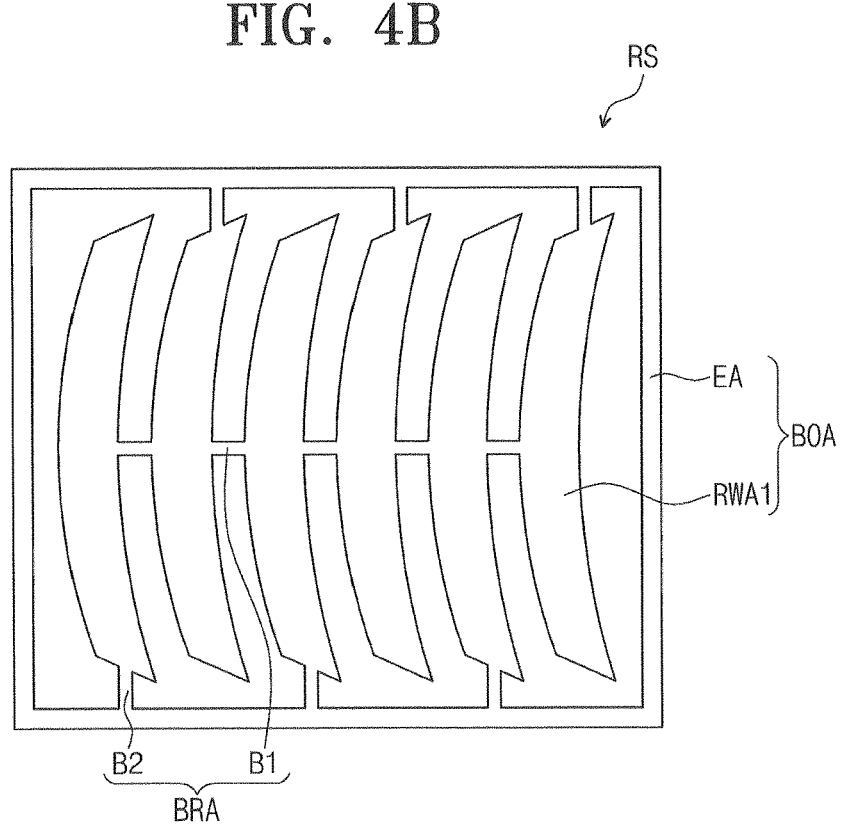

FIG. 4B is a plane view of the reflection sheet RS for explaining the providing of the reflection sheet.

As illustrated in FIG. 4B, the reflection sheet RS including the body areas BOA and the bridge areas BRA connecting the body areas BOA is provided.

The body areas BOA include first sidewall areas RWA1 each of which has a shape corresponding to that of each of the third and fourth sidewall parts W3 and W4. The first sidewall areas RWA1 may be spaced a predetermined distance apart from each other and parallelly arranged along one direction. The first sidewall areas RWA1 may be disposed to correspond to the print areas PA, respectively.

The bridge areas BRA include a first bridge area B1 connecting the first sidewall areas RWA1 to each other. The first bridge area B1 is disposed between the first sidewall areas RWA1. For example, if two first sidewall areas are provided, one first bridge area is disposed between the two first sidewall areas to connect the two first sidewall areas to each other.

Since the first sidewall areas RWA1 are connected to each other by the first bridge area B1, the first sidewall areas RWA1 may be integrally moved and disposed while maintaining a predetermined distance therebetween.

The body area BOA may further include an edge area EA surrounding the first sidewall areas RWA1. Here, the bridge areas BRA may further include second bridge areas B2 connecting the first sidewall areas RWA1 to the edge area EA.

The edge area EA may have a rectangular ring shape. However, the present disclosure is not limited thereto. For example, if all of the first sidewall areas RWA1 are disposed in the edge area EA, the edge area EA may have a circular or polygonal shape. The edge area EA is connected to the first sidewall areas RWA1 by the second bridge areas B2. Thus, the first sidewall areas RWA1 may be tightly fixed. Also, when the body areas BOA move, the edge area EA may be picked up to move. Thus, damage applied to the first sidewall areas RWA1 may be reduced.

The second bridge areas B2 may be connected to one or the other end of each of the first sidewall areas RWA1. In an embodiment of the inventive concept, the second bridge areas B2 are disposed on one ends of odd-order first sidewall areas and disposed on the other ends of even-order first sidewall areas. However, the present disclose is not limited thereto. If the first sidewall areas RWA1 are tightly fixed to the edge area EA, the second bridge areas B2 may be disposed on one ends or the other ends of the first sidewall areas RWA1 and disposed both of one and the other ends of the first sidewall areas RWA1. Since the second bridge area B2 connects the first sidewall areas RWA1 to the edge area EA at the one and the other ends of the first sidewall areas RWA1, the first sidewall areas RWA1 may be tightly fixed to the edge area EA without being distorted.

Figure 4C:
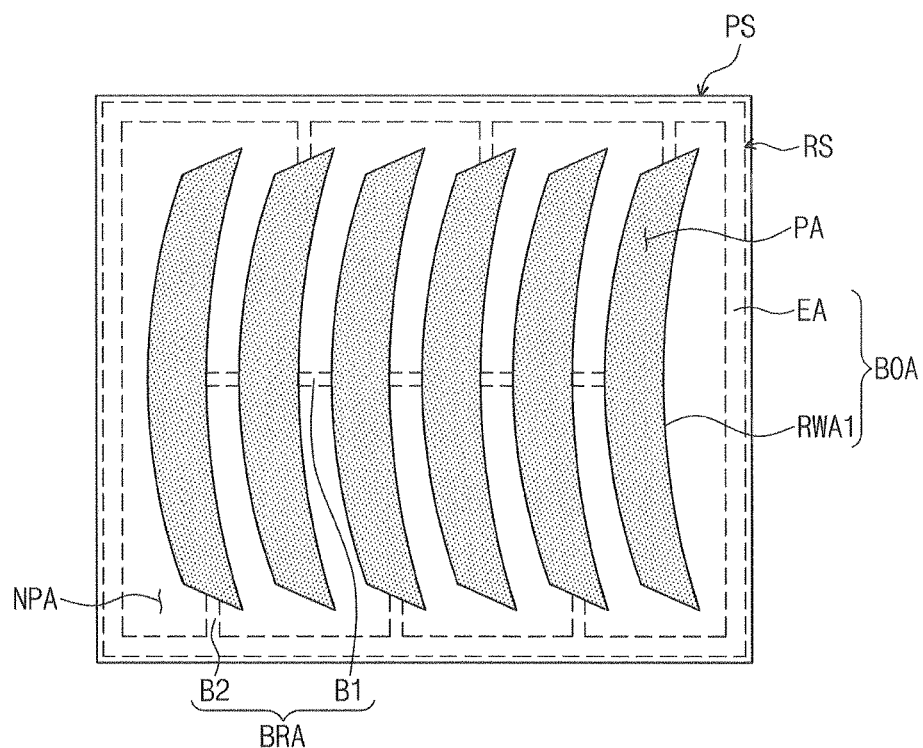

FIG. 4C is a view for explaining disposing the print screen on the reflection sheet so that the print areas respectively correspond to the printed areas of the body areas. FIG. 4C is a plane view of the print screen PS and the reflection sheet RS overlapping each other.

As illustrated in FIG. 4C, the print screen PS is provided on the reflection sheet RS. The reflection sheet RS overlaps the print screen PS so that the print areas PA of the print screen PS respectively correspond to the first sidewall areas RWA1 of the reflection sheet RS to overlap the first sidewall areas RWA1.

The non-print areas NPA of the print screen PS overlap the edge area EA and the bridge areas BRA of the reflection sheet RS.

The print screen PS is disposed to overlap the reflection sheet RS, and then the reflection control material is applied on the print areas PA. Then, the reflection control material may be pushed out so that the reflection adjustment material penetrates through the print areas PA. The reflection control material penetrating through the print areas PA is printed on the printed areas, that is, on the first sidewall areas RWA1. As a result, reflection control patterns may be formed on the first sidewall areas RWA1.

In an embodiment of the inventive concept, the reflection adjustment material may be ink. The reflection control material is a material for reducing reflectivity of light. Colored ink, for example, ink in which yellow ink is mixed with grey ink may be used as the reflection control material.

Figure 4D:
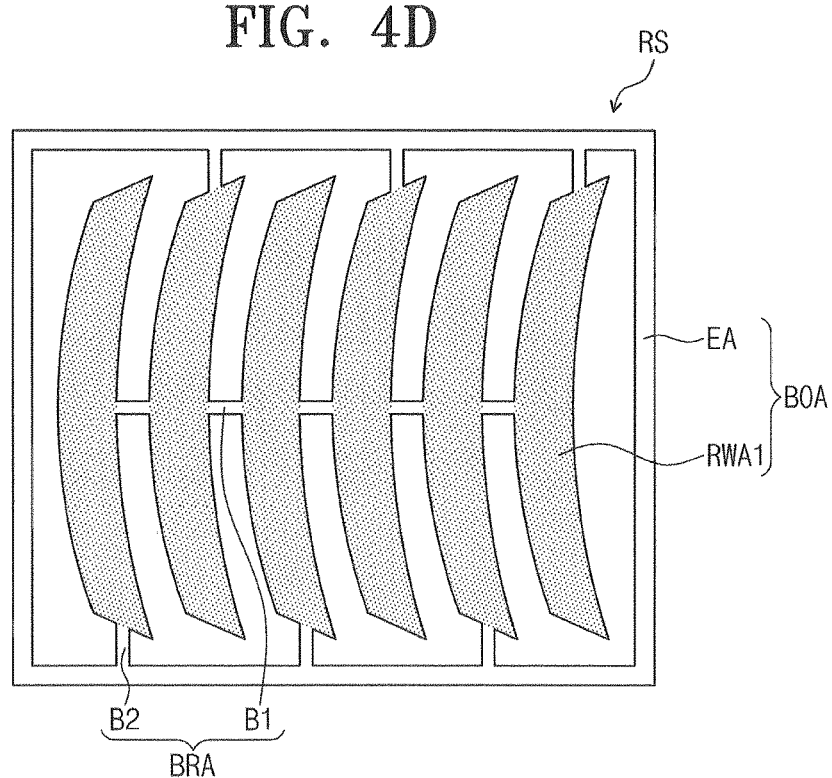

FIG. 4D is a view for explaining the removing of the print screen from the reflection sheet. FIG. 4D is a plane view of the reflection sheet RS on which a reflection pattern is printed.

As illustrated in FIG. 4D, the reflection control pattern is printed on the printed area, and then the print screen PS is removed from the reflection sheet RS. The reflection sheet RS includes the first sidewall areas RWA1 on which the reflection control patterns are printed.

In an embodiment of the inventive concept, the method may further include drying for completely coloring the reflection control patterns on the first sidewall areas RWA1. In the drying, the reflection control patterns may be naturally dried, or be dried by using a chamber and a UV lamp.

Figure 4E:
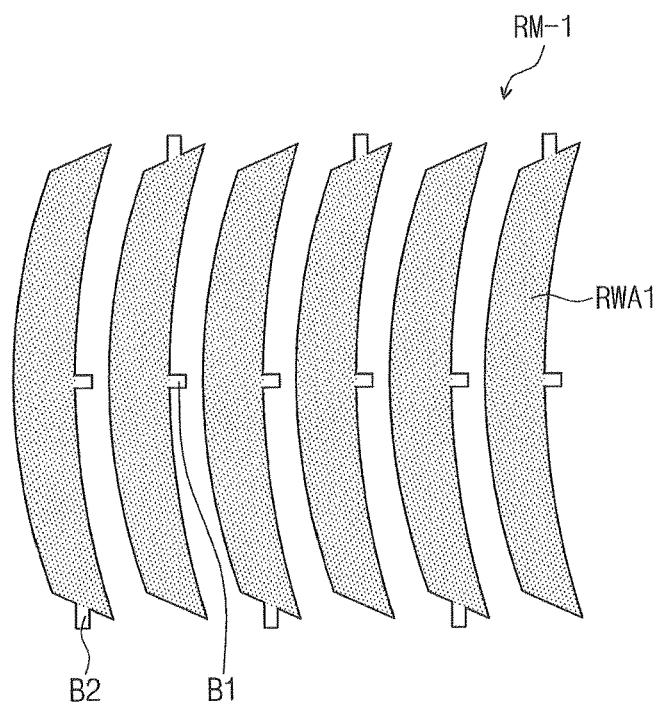

FIG. 4E is a view for explaining the cutting of the bridge areas to separate the body areas from each other. FIG. 4E is a plane view of the first reflection member RM-1.

As illustrated in FIG. 4E, each of the first and second bridge areas B1 and B2 is cut. Thus, the first reflection member RM-1 from which the edge area (see reference symbol EA of FIG. 4D) is separated and in which the first sidewall areas RWA1 are separated from each other is provided.

A portion of the first bridge area B1 and a portion of the second bridge area B2 may be connected to at least one side of the first sidewall areas RWA1. However, the present disclosure is not limited thereto. For example, all of the first and second bridge areas B1 and B2 may be removed from the first sidewall areas RWA1.

Figure 4F:
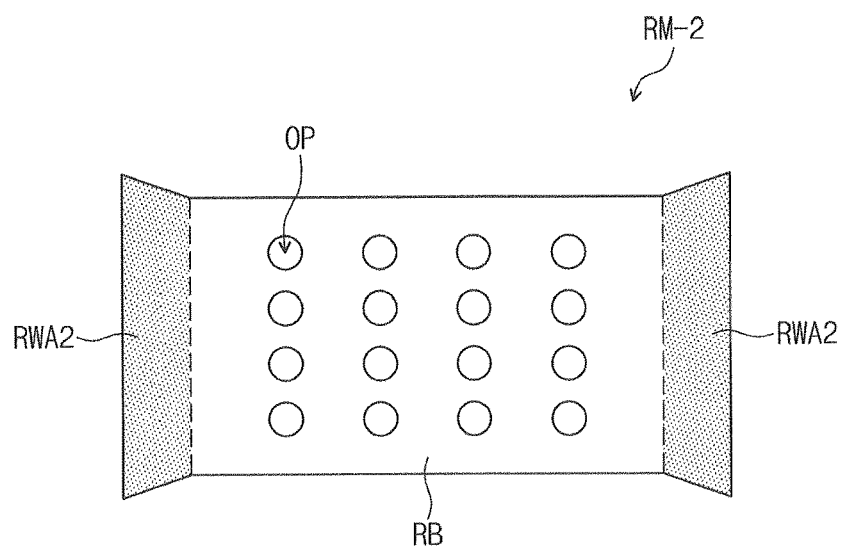

FIG. 4F is a view for explaining the forming of the second reflection member. FIG. 4F is a plane view of the second reflection member RM-2.

As illustrated in FIG. 4F, the second reflection member RM-2 including a bottom area RB and second sidewall areas RWA2 is provided. The bottom area RB corresponds to the bottom part BB of the bottom chassis BC. The bottom area RB may have a rectangular shape corresponding to that of the bottom part BB. The bottom area RB includes a plurality of openings OP.

The second sidewall areas RWA2 may correspond to the first and second sidewall parts W1 and W2 of the bottom chassis BC. The second sidewall areas RWA2 are connected to the bottom area RB. Each of the second sidewall areas RWA2 may have a shape corresponding to that of each of the first and second sidewall parts W1 and W2. The reflection control pattern is printed on a top surface of each of the second sidewall areas RWA2. The reflection control pattern is provided to reduce reflectivity of light. The ink may be printed on the reflection control pattern.

Figure 4G:
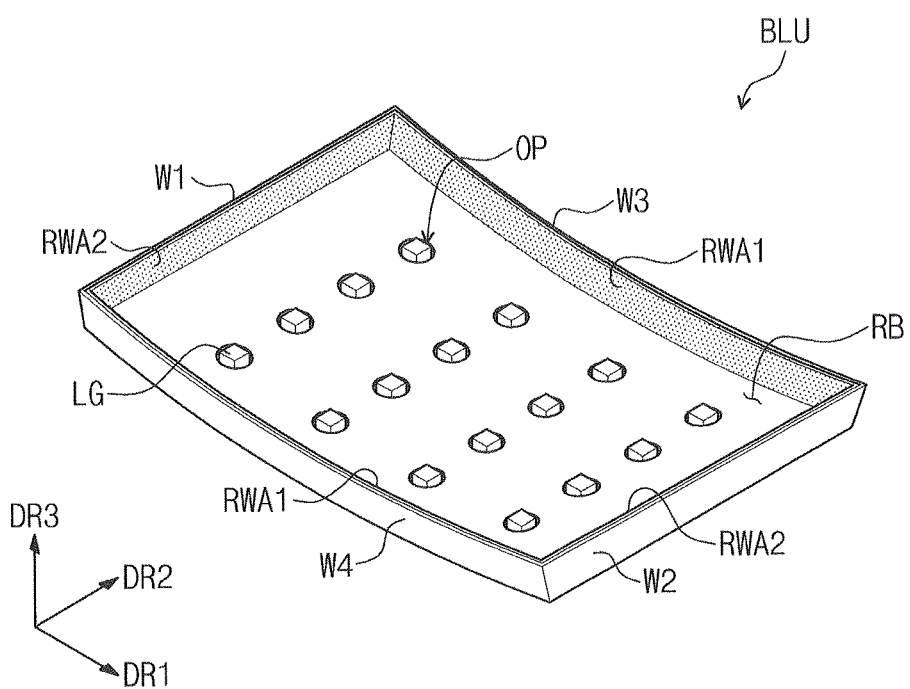

FIG. 4G is a view for explaining the disposing of the reflection member on the bottom chassis. The FIG. 4G is a perspective view illustrating a portion of the backlight unit BLU.

As illustrated in FIG. 4G, the first and second reflection members RM-1 and RM-2 may be disposed on the bottom chassis BC. In an embodiment of the inventive concept, the first reflection member RM-1 is firstly disposed, and then the second reflection member RM-2 is disposed.

The first sidewall areas RWA1 may be disposed on top surfaces of the third and fourth sidewalls W3 and W4 of the bottom chassis BC, respectively. The first bridge area B1 connected to the first sidewall areas RWA1 may be disposed on the bottom part BB of the bottom chassis BC. The second bridge area B2 connected to one end or the other end of the first sidewall areas RWA1 may be disposed on the first sidewall part W1 or the second sidewall part W2.

The second reflection member RM-2 is disposed on the bottom part BB and the first and second sidewall parts W1 and W2.

The bottom area RB is disposed to face the bottom part BB with the light source unit LU therebetween. The plurality of light emitting diode packages LG of the light source unit LU may be disposed to respectively correspond to the openings OP to pass through the openings OP. Also, the bottom area RB may be disposed to face the bottom part BB with the first bridge area B1 therebetween to prevent the first bridge area B1 from being seen from the outside.

The second sidewall areas RWA2 are disposed on the first and second sidewall parts W1 and W2, respectively. One of the second sidewall areas RWA2 may be disposed on the first or second sidewall part W1 or W2 with the second bridge area B2 that is disposed on the first or second sidewall part W1 or W2 therebetween to prevent the second bridge area B2 from being seen from the outside.

According to the related art, in the reflection member of the curved display device, when the reflection control patterns are printed on the first sidewall areas having curved shapes of the reflection member, the patterns are printed in a state where the first sidewall areas are spaced apart from each other. Here, positions between the first sidewall areas are twisted to cause printing tolerance.

However, in the method of manufacturing the backlight unit of the curved display device according to an embodiment of the inventive concept, the body areas BOA may be connected to each other by the bridge areas BRA and thus be fixed in position during the printing process. Thus, a printing tolerance factor may be reduced, and productivity may be improved.

Hereinafter, a method of manufacturing a backlight unit of a curved display device according to another embodiment of the inventive concept will be described. For convenience of description, repeated description of an embodiment of the inventive concept will be omitted.

In reference to FIGS. 2 and 5A to 5F, the method of manufacturing the backlight unit of the curved display device according to another embodiment of the inventive concept includes providing a bottom chassis having a predetermined curvature radius, manufacturing a third reflection member, and disposing the third reflection member on the bottom chassis.

The manufacturing of the third reflection member includes preparing a print screen on which print areas through which a reflection control material penetrates are defined, providing a reflection sheet including body areas and bridge areas connecting the body areas to each other, disposing the print screen on the reflection sheet so that the print areas respectively correspond to printed areas of the body areas, printing reflection control patterns on the printed areas, removing the print screen from the reflection sheet, and cutting the bridge areas to separate the body areas from each other.

Figure 5A:
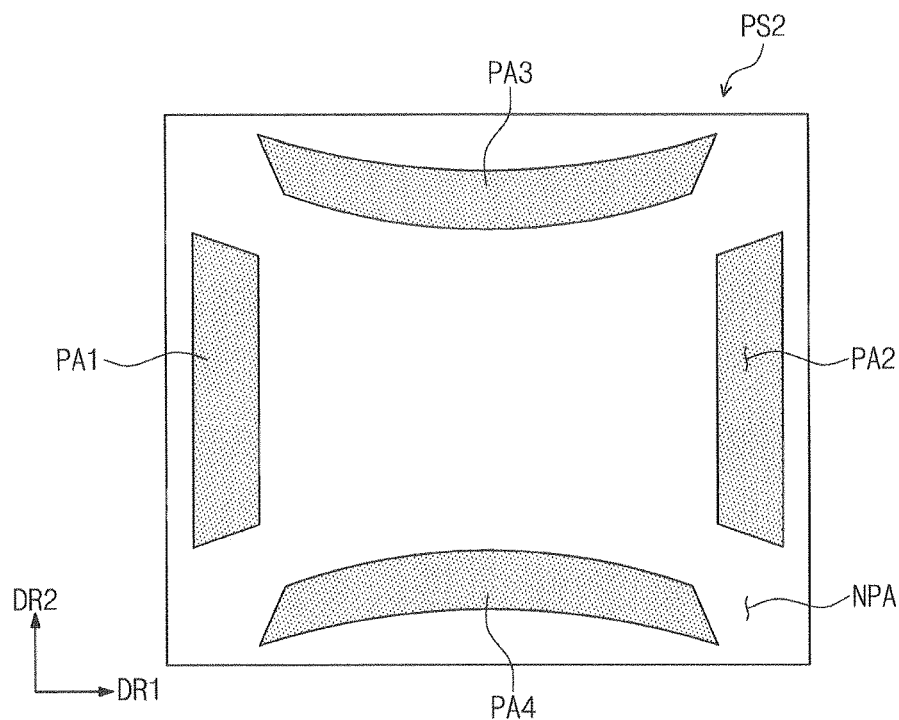
FIGS. 5A to 5F are plane views illustrating a method of manufacturing a backlight unit of a curved display device according to another embodiment of the inventive concept.

FIG. 5A is a plane view of a print screen PS2 for explaining the preparing of the print screen.

First, as illustrated in FIG. 5A, the print screen PS2 including first to fourth print areas PA1 to PA4 through which the reflection control material penetrates and the non-print area NPA except for the first to fourth print areas PA1 to PA4 is provided. Each of the first to fourth print areas PA1 to PA4 has a shape corresponding to that of each of the first to fourth sidewall parts W1 to W4 of the bottom chassis BC. The first to fourth print areas PA1 to PA4 are disposed along an edge of the print screen PS2.

The first and second print areas PA1 and PA2 are disposed spaced apart from each other in a first direction DR1. Each of the first and second print areas PA1 and PA2 extends in a second direction DR2. The third and fourth print areas PA3 and PA4 are disposed spaced apart from each other in the second direction DR2. Each of the third and fourth print areas PA3 and PA4 has a curved shape to extend along the first direction DR1.

Figure 5B:
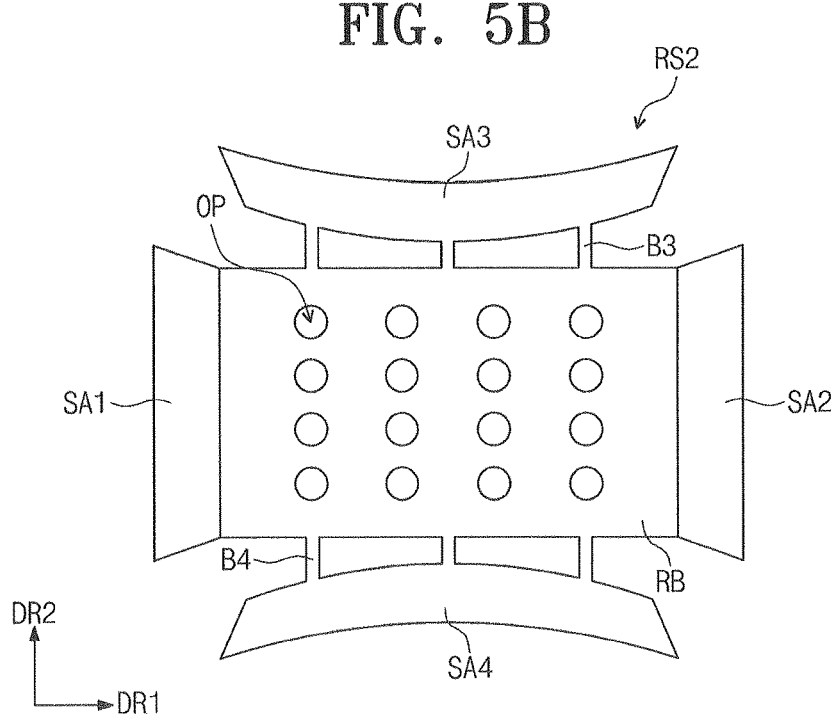

FIG. 5B is a plane view of the reflection sheet RS2 for explaining the providing of the reflection sheet.

As illustrated in FIG. 5B, the reflection sheet RS2 includes the body areas and the bridge areas connecting the body areas to each other.

The body areas include a bottom area RB and first to fourth sub areas SA1 to SA4.

The bottom area RB corresponds to the bottom part BB of the bottom chassis BC. The bottom area RB has a rectangular shape to correspond to the shape of the bottom part BB. The bottom area BB includes a plurality of openings OP.

The first and second sub areas SA1 and SA2 are spaced apart from each other in the first direction DR1 and thus are respectively connected to both sides of the bottom area RB. Each of the first and second sub areas SA1 and SA2 has a shape corresponding to that of each of the first and second sidewall parts W1 and W2.

The third and fourth sub areas SA3 and SA4 are spaced apart from each other in the second direction DR2. Each of the third and fourth sub areas SA3 and SA4 may have a curved shape extending along the first direction DR1 to correspond to the shape of each of the third and fourth sidewall parts W3 and W4. The third and fourth sub areas SA3 and SA4 are disposed spaced a predetermined distance apart from the bottom area RB.

The bridge areas include a third bridge area B3 and a fourth bridge area B4. The third bridge area B3 connects one end of the bottom area RB to the third sub area SA3. At least one bridge area B3 may be provided so that the third sub area SA3 is fixed at a position spaced a predetermined distance apart from the bottom area RB. At least one fourth bridge area B4 may be provided so that the fourth sub area SA4 is fixed at a position spaced a predetermined distance apart from the bottom area RB.

Figure 5C:
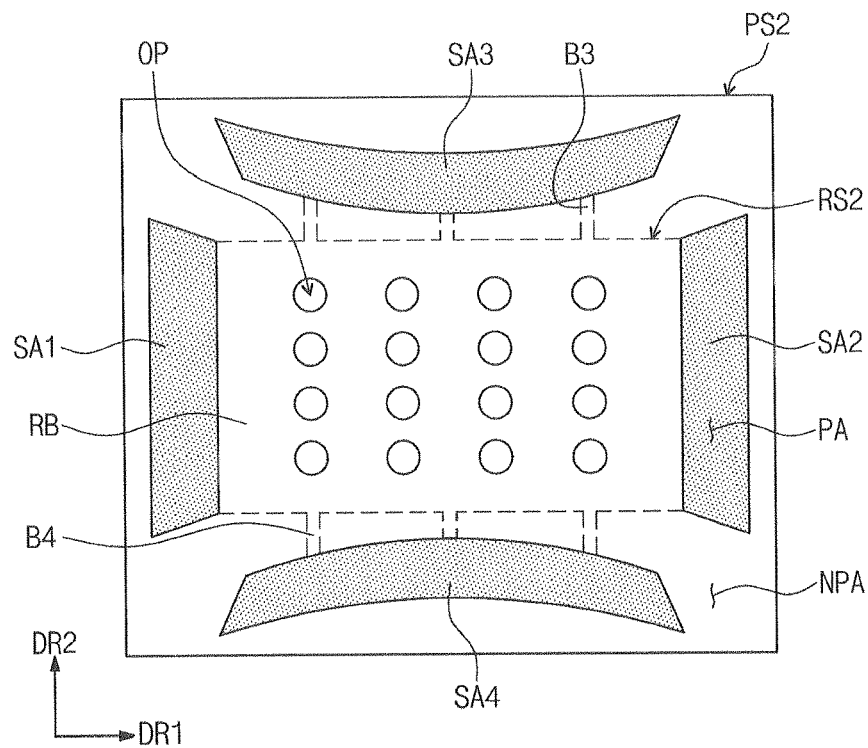

FIG. 5C is a view for explaining the disposing of the print screen on the reflection sheet so that the print areas respectively correspond to the printed areas of the body areas. The FIG. 5C is a plane view of the print screen PS2 and the reflection sheet RS2 overlapping each other.

As illustrated in FIG. 5C, the print screen PS2 is provided on the reflection sheet RS2. The first to fourth print areas PA1 to PA4 of the print screen PS2 overlap the first to fourth sub areas SA1 to SA4 of the reflection sheet RS2, respectively.

The non-print areas NPA of the print screen PS2 may overlap the bottom area RB, the third and fourth bridge areas B3 and B4 of the reflection sheet RS2.

The print screen PS2 is disposed to overlap the reflection sheet RS2, and then the reflection control material is applied onto the first to fourth print areas PA1 to PA4. Then, the reflection control material may be pushed out so that the reflection adjustment material penetrates through the first to fourth print areas PA1 to PA4. The reflection control material penetrating through the first to fourth print areas PA1 to PA4 is printed on the printed area, that is, on the first to fourth sub areas SA1 to SA4. As a result, reflection control patterns may be formed on the first to fourth sub areas RWA1.

In another embodiment of the inventive concept, the reflection adjustment material may be ink. The reflection control material is a material for reducing reflectivity of light. Colored ink, for example, ink in which yellow ink is mixed with grey ink may be used as the reflection control material.

Figure 5D:
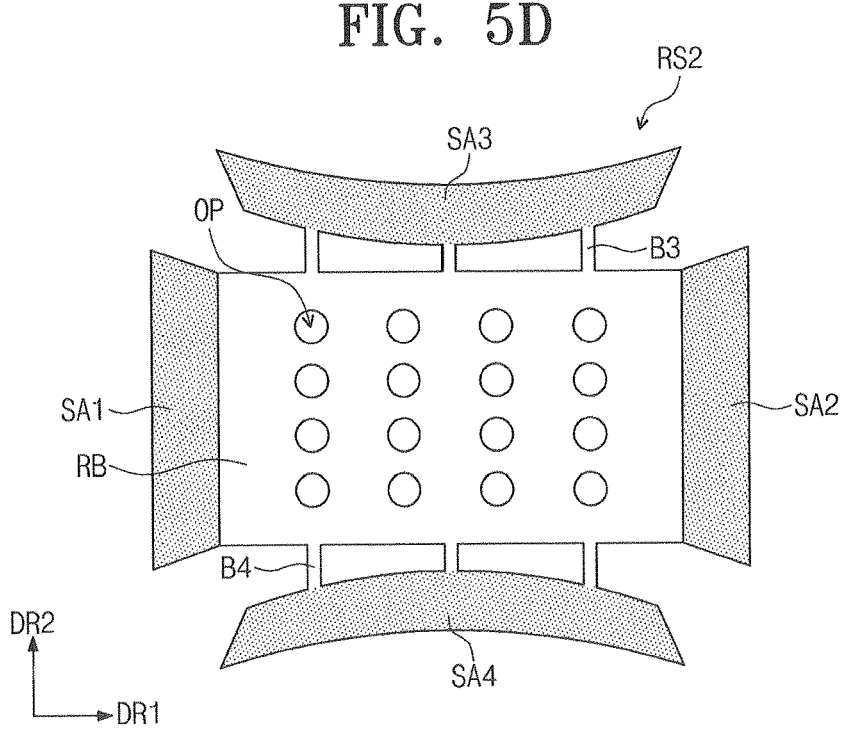

FIG. 5D is a view for explaining the removing of the print screen from the reflection sheet. FIG. 5D is a plane view of the reflection sheet RS2 on which a reflection pattern is printed.

As illustrated in FIG. 5D, the reflection control pattern is printed on the printed area, and then the print screen PS2 is removed from the reflection sheet RS2. The reflection sheet RS2 includes the first to fourth sub areas SA1 to SA4 on which the reflection control patterns are printed.

In another embodiment of the inventive concept, the method may further include drying for completely coloring the reflection control patterns on the first to fourth sub areas SA1 to SA4. In the drying, the reflection control patterns may be naturally dried, or be dried by using a chamber and a UV lamp.

Figure 5E:
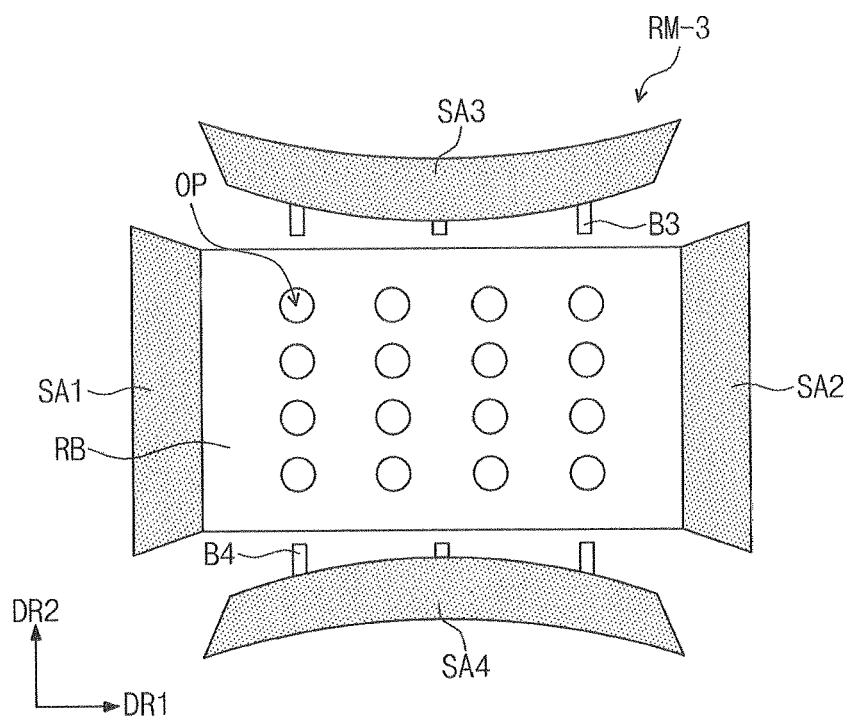

FIG. 5E is a view for explaining the cutting of the bridge areas to separate the body areas from each other. FIG. 5E is a plane view of the first reflection member RM-3.

As illustrated in FIG. 5E, each of the third and fourth bridge areas B3 and B4 is cut. Thus, the third reflection member RM-3 from which the third and fourth sub areas SA3 and SA4 are separated from the bottom area RB is provided.

At least one portion of the third bridge area B3 may be connected to one side of the third sub areas SA3, which is adjacent to the bottom area RB of the third sub areas SA3. At least one portion of the fourth bridge area may be connected to one side of the fourth sub area SA4, which is adjacent to the bottom area RB of the fourth area SA4. However, the present disclosure is not limited thereto, and for example, all of the third and fourth bridge areas B3 and B4 may be removed from the third and fourth sub areas SA3 and SA4.

The bottom area RB and the first and second sub areas SA1 and SA2 may be integrally provided. However, if necessary, the first and second sub areas SA1 and SA2 may be spaced apart from the bottom area RB, and the present disclosure is not limited thereto.

Figure 5F:
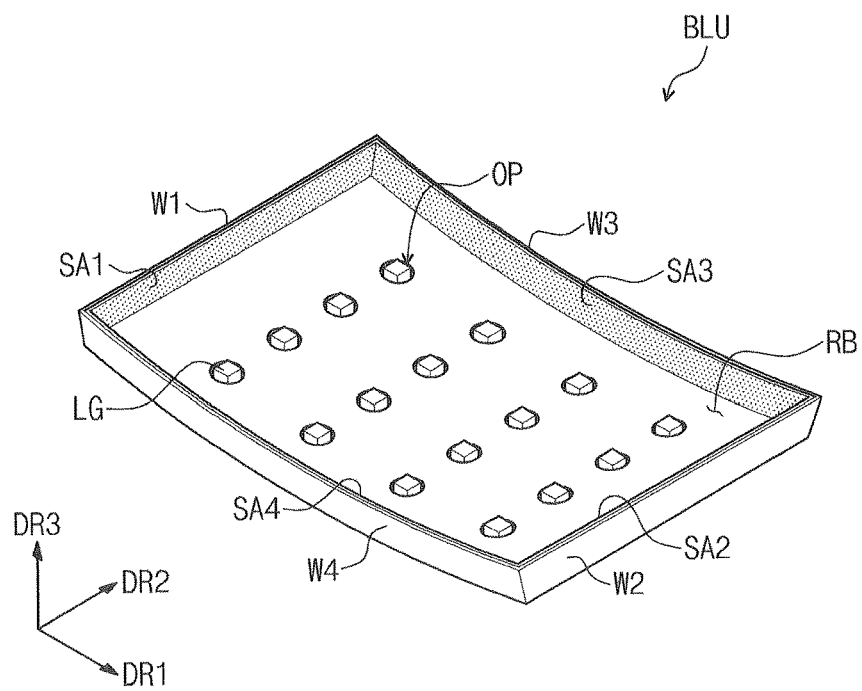

FIG. 5F is a view for explaining the disposing of the reflection member on the bottom chassis. FIG. 5F is a perspective view illustrating a portion of the backlight unit BLU.

As illustrated in FIG. 5F, the third reflection member RM-3 may be disposed on the bottom chassis BC. The third and fourth sub areas SA3 and SA4 may be attached onto the third and fourth sidewall parts W3 and W4 of the bottom chassis BC, respectively.

Here, the third bridge area B3 connected to the one side of the third sub area SA3 is disposed on the bottom part BB of the bottom part BB. Also, the fourth bridge area B4 connected to one side of the fourth sub area SA4 is disposed on the bottom part BB. Then, the bottom area RB is disposed on the bottom part BB, and the first and second sub areas SA1 and SA2 are disposed on the first and second sidewall parts W1 and W2 of the bottom chassis BC, respectively.

The bottom area RB is disposed to face the bottom part BB with the light source unit LU therebetween. The plurality of light emitting diode packages LG of the light source unit LU are disposed to correspond to the openings OP, respectively. The plurality of light emitting diode packages LG pass through the openings OP. Also, the bottom area RB may be disposed to face the bottom part BB with the third and fourth bridge areas B3 and B4 therebetween to prevent the third and fourth bridge areas B3 and B4 from being seen from the outside.

In the method of manufacturing the backlight unit of the curved display device according to an embodiment of the inventive concept, the reflection control pattern may be easily printed on the reflection member to improve productivity.

It will be apparent to those skilled in the art that various modifications and variations can be made in the present disclosure. Thus, it is intended that the present disclosure covers the modifications and variations of this invention provided they come within the scope of the appended claims and their equivalents.

Thus, the invention should not be construed as being limited to the embodiments set forth herein and should be only defined by scopes of claims.

What is claimed is:

1. A method of manufacturing a backlight unit of a curved display device, the method comprising:
    providing a bottom chassis having a predetermined curvature radius;
    manufacturing a reflection member; and
    disposing the reflection member on the bottom chassis,
    wherein the manufacturing of the reflection member comprises:
        preparing a print screen on which print areas allowing a reflection control material to be penetrated therethrough are defined;
        providing a reflection sheet comprising body areas and bridge areas connecting the body areas to each other;
        disposing the print screen on the reflection sheet so that the print areas of the print screen correspond to printed areas of the body areas of the reflection sheet, respectively;
        printing a reflection control pattern on each of the printed areas of the reflection sheet;
        removing the print screen from the reflection sheet; and
        cutting the bridge areas to separate the body areas of the reflection sheet from each other.

2. The method of claim 1, wherein the bottom chassis comprises:
    a bottom part that is a curved surface which is concavely curved in a first direction to have the predetermined curvature radius; and
    a plurality of sidewall parts bent from the bottom part.

3. The method of claim 2, wherein the sidewall parts of the bottom chassis comprise:
    first and second sidewall parts disposed spaced apart from each other in the first direction with the bottom part disposed therebetween; and
    third and fourth sidewall parts disposed spaced apart from each other in a second direction perpendicular to the first direction, the third and fourth sidewall parts being curved along the curved surface.

4. The method of claim 3, wherein the body areas of the reflection sheet comprise first sidewall areas each of which has a shape corresponding to that of each of the third and fourth sidewall parts of the bottom chassis, and
    the bridge areas comprise a first bridge area connecting the first side areas to each other.

5. The method of claim 4, wherein the body areas of the reflection sheet further comprise an edge area surrounding the first sidewall areas, and
    the bridge areas of the reflection sheet further comprise second bridge areas connecting the edge area to the first sidewall areas.

6. The method of claim 4, wherein the printed areas comprise the first sidewall areas.

7. The method of claim 6, further comprising preparing the reflection member comprising a bottom area corresponding to the bottom part of the bottom chassis and second sidewall areas connected to the bottom area and on which the reflection control pattern is printed.

8. The method of claim 7, wherein, in the disposing of the reflection sheet on the bottom chassis,
    the first sidewall areas are disposed on the third and fourth sidewall parts, and
    the bottom area and the second sidewall areas are disposed on the bottom part and the first and second sidewall parts.

9. The method of claim 7, wherein the bottom area of the reflection member comprises a plurality of openings.

10. The method of claim 3, wherein the body areas of the reflection member comprise:
    a bottom area corresponding to the bottom part of the bottom chassis;
    first and second sub areas respectively connected to both sides of the bottom area in a state where the first and second sub areas are spaced apart from each other in the first direction, the first and second sub areas having shapes respectively corresponding to those of the first and second sidewall parts; and
    third and fourth sub areas disposed spaced apart from each other in the second direction, the third and fourth sub areas having shapes respectively corresponding to those of the third and fourth sidewall parts.

11. The method of claim 10, wherein the bottom area of the reflection member comprises a plurality of openings.

12. The method of claim 11, wherein the bridge areas comprise:
    at least one third bridge area connecting the third sub area to one end of the bottom area; and
    at least one fourth bridge area connecting the fourth sub area to the other end of the bottom area facing the one end of the bottom area.

13. The method of claim 12, wherein the printed areas comprise the first to fourth sub areas.

14. The method of claim 13, wherein, in the disposing of the reflection sheet on the bottom chassis, the third and fourth sub areas are disposed on the third and fourth sidewall parts, respectively, and
    the bottom area, the first and second sub areas are disposed on the bottom part, the first and second sidewall parts, respectively.

15. The method of claim 1, wherein the reflection control pattern is a reflection amount reduction pattern for reducing reflectivity of incident light.

\* \* \* \* \*

UNITED STATES PATENT AND TRADEMARK OFFICE
CERTIFICATE OF CORRECTION

| | | |
|---|---|---|
| PATENT NO. | : 10,048,539 B2 | Page 1 of 1 |
| APPLICATION NO. | : 14/944098 | |
| DATED | : August 14, 2018 | |
| INVENTOR(S) | : Kangwoo Lee and Yudong Kim | |

It is certified that error appears in the above-identified patent and that said Letters Patent is hereby corrected as shown below:

On the Title Page

At item (72) Inventors, the City of the Second Inventor should be changed from "Suron-si (KR)" to --Suwon-si (KR)--.

Signed and Sealed this
Thirteenth Day of August, 2019

Andrei Iancu
*Director of the United States Patent and Trademark Office*